Figure 1B:
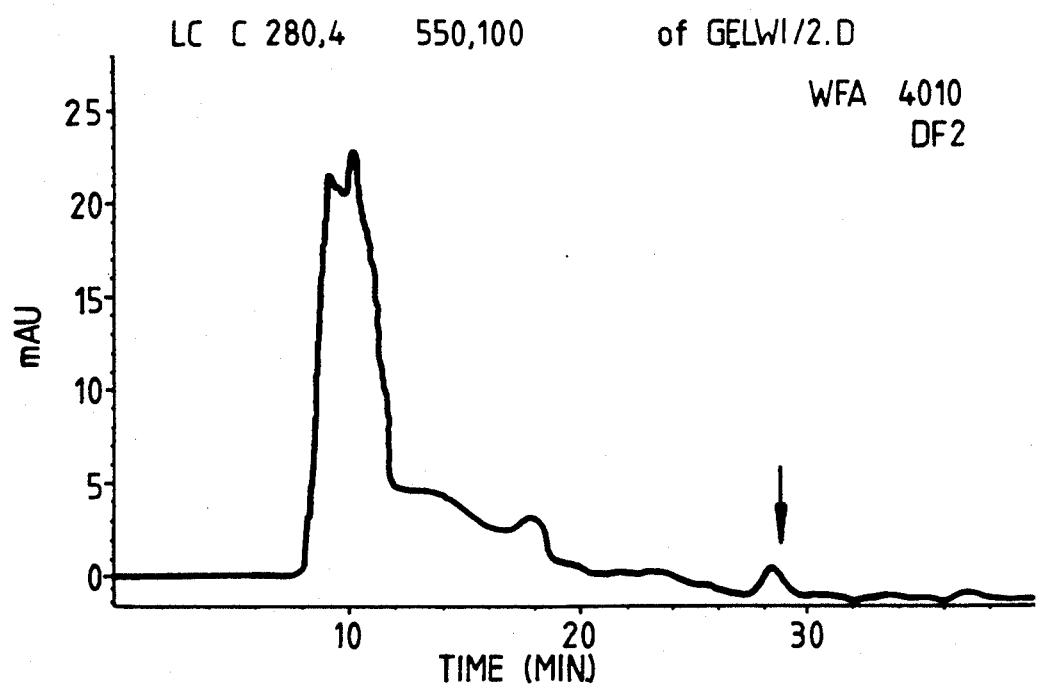

United States Patent [19]
Barmentlo et al.

[11] Patent Number: 5,145,704
[45] Date of Patent: Sep. 8, 1992

[54] METHOD OF PREPARING AN EMULSION SPREAD USING A WET GELATINE RETENTATE

[75] Inventors: Bart Barmentlo, Delft; Nigel K. Slater, Maasdam, both of Netherlands

[73] Assignee: Van den Bergh Foods Co., Division of Conopco, Inc., Lisle, Ill.

[21] Appl. No.: 671,633

[22] Filed: Mar. 19, 1991

Related U.S. Application Data

[63] Continuation of Ser. No. 381,333, Jul. 18, 1989, abandoned.

[30] Foreign Application Priority Data

Jul. 18, 1988 [GB] United Kingdom ............... 8817093

[51] Int. Cl.⁵ .................................... A23D 7/00
[52] U.S. Cl. .................................. 426/576; 426/386; 426/387; 426/388; 426/602; 426/603; 426/613
[58] Field of Search ............... 426/576, 386, 387, 388, 426/602, 603, 613

[56] References Cited

U.S. PATENT DOCUMENTS 4,224,348  9/1980  Hayashi et al. .................... 426/576

FOREIGN PATENT DOCUMENTS 0076549  4/1983  European Pat. Off. .
638871  3/1981  France .
61141858  6/1980  Japan .

OTHER PUBLICATIONS

European Search Report and Annex.
Developments in Food Science: Frontiers of Flavor, Proceeding of the 5th International Flavor Conference, pp. 271-278.
Flavour and Fragrance Journal, vol. 1, 91-104 (1986).
Chemical Abstract 23:543.
Fane and Friend "Dewatering of Gelatin Liquor by Ultrafiltration" Chemeca 77, Canberra, 14-16 Sep. 1977.

Primary Examiner—Jeanette Hunter
Attorney, Agent, or Firm—Rimma Mitelman

[57] ABSTRACT

A method of preparing a water-in-oil emulsion spread by mixing a wet gelatin retentate wherein the off flavor has been reduced by membrane filtration to remove a low molecular weight fraction, with a fat phase.

7 Claims, 2 Drawing Sheets

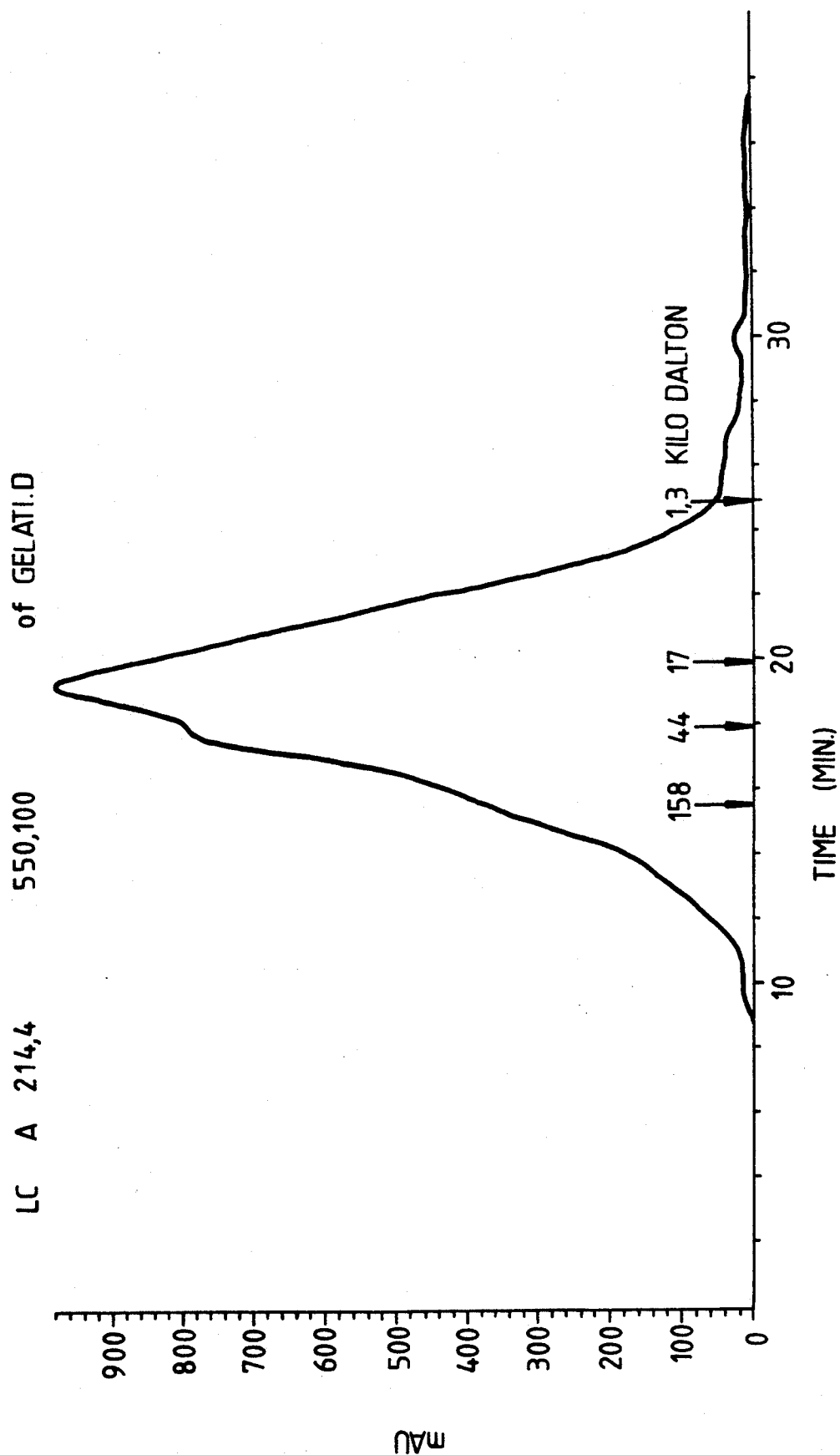

METHOD OF PREPARING AN EMULSION SPREAD USING A WET GELATINE RETENTATE

This is a continuation application of Ser. No. 07/381,333, filed Jul. 18, 1989, now abandoned.

The present invention is concerned with treatment of gelling agents, more particularly applicable to the treatment of gelatins, so as to remove or reduce off-flavours.

Gelatine is a well known proteinaceous gelling agent which is widely used in food manufacture and in the photographic and pharmaceutical industries. Gelatine is produced from animal tissues, often as a slaughter-house by-product, by a process involving physical and chemical treatment followed by hot-water extraction. In the food industry gelatine is employed in a remarkable range of products including wine-gums, sweets, corned beef, low-fat spreads, sausage coatings, aspic products and ice-cream. Gelatine is also employed as a "fining" in wine-making.

The gel-strength of gelatine is related to the so-called "Bloom" value. From which a theoretical estimate of the gel-strength can be obtained with a expected error of approximately 10% from the measured value.

Chemically, gelatine comprises partially hydrolysed collagen, the most common structural component of many animal tissues. The molecular weight of collagen is believed to lie in the region of 340 kD, and the intact collagen macro-molecule is believed to comprise three sub-units each of around 100 kD. Gelatine is not a globular protein. The transition temperature from collagen to gelatine differs from one species to another, but is characterised by a contraction of the collagen fibres to about one third of their original length and a radical modification of the X-ray diffraction pattern.

Gelatine has long been known to be a nutritionally incomplete protein, as it lacks the essential amino-acid tryptophane and methionine is only present in small quantities, it does however contain sufficient hydroxyproline to allow it's specific presence to be detected in products.

In the conventional process for the manufacture of gelatine, collagen rich tissues such as calf- and pig-skin trimmings, white connective tissue and large bones are limed and washed before being macerated in acid or alkaline solution while being heated in a kettle. The heating process continues for many hours during which time several fractions are taken. The first fractions are of markedly better quality than the later fractions, being less degraded, and therefore command a higher market value. The immediate product of this process is not unlike thin soup.

In a known process for dewatering of the crude gelatine liquor (the "soup"), the raw solution is concentrated to about 20% wt in a triple effect evaporator, filtered and further concentrated to about 35% wt in a single stage climbing-film evaporator. Final processing involves chilling, air drying to about 90% wt gelatine followed by crushing, testing, blending and packaging.

As an alternative to the abovementioned evaporative dewatering process, ultra-filtration has been suggested for concentration of the gelatine liquor. Such a process is described by Fane and Friend (Chemeca 77, Canberra, 14–16 Sep. 1977). An observed benefit of the ultra-filtration process was the de-ashing of the product which accompanied ultra-filtration; that is, the removal of calcium. However it was noted that while proteins were almost completely rejected by the ultra-filtration membrane, inorganic species such as sulphur-dioxide were anomalously also rejected. The authors of the abovementioned document concluded that for economic reasons ultra-filtration was a viable alternative in the initial dewatering and de-ashing of the gelatine liquor, which is then dried.

Typically, high grade gelatine produced by the conventional methods has a mild off-flavour which has been described as sickly, musty, cardboard-like or animal-like. While this does not present a problem in products such as wine gums or strongly-flavored sweets, use of gelatine in relatively bland products such as edible spreads, particularly low-fat spreads, is hindered by the characteristic off-flavour of gelatine. Notwithstanding this, such are the advantages to be gained by the use of gelatine in spreads, particularly as regards the melting behaviour of the gels obtained, that medium fat products containing gelatine have enjoyed some commercial success. However, as the mass fraction of gelatine present in a product is increased the off-flavour associated with its use becomes progressively more noticeable and the products become progressively less acceptable. For this reason, spreads manufactures are restricted to the use of high-quality gelatines obtained in the early part of the gelatine extraction process. As mentioned above, these high-quality fractions are expensive.

As is obvious from the production process, lower quality gelatines are also produced. These range in quality from those suitable for use in highly flavored foods through those suitable for animal foods, particularly "pet foods", to those only suitable for non-food usage. The market for these materials is relatively stable. As the demand for high quality gelatine increases so the production of low quality gelatine must also increase and difficulties have been encountered in disposing of these materials commercially. This restricts the supply of high quality gelatine and may elevate the price.

The present technical problem is therefore how the cost of high-quality gelatines for food use can be reduced by facilitating the use of lower quality fractions in products fit for human consumption.

We have now determined that the off-flavour may be reduced by a membrane filtration specifically to remove a low-molecular weight fraction of the gelatine.

Accordingly, a first aspect of the present invention provides gelatine substantially without a low molecular weight fraction.

Other advantages are found in the provision of such a gelatine, especially where the gelatine has been mistreated during production or transport or in other circumstances where it is necessary to remove low molecular weight contaminants or degradation products.

According to a second aspect of the present invention there is provided a process for the purification of gelatine which comprises removal of a low-molecular weight fraction by membrane filtration, preferably diafiltration.

Diafiltration apparatus is similar to ultrafiltration apparatus, in that the apparatus comprises an extensive membrane surface through which a solvent may pass but which retains relatively large molecules. However, it should be noted that in ultrafiltration the objective is to remove only the solvent and very low-molecular weight salts, whereas in diafiltration species with moderate molecular weights may cross the membrane. The diafiltration process of the present invention is therefore not identical to the dewatering process of Fane and Friend (cit. ultra) as described in the prior art. Moreover, in preferred embodiments of the present invention the gelatine is not dried after the diafiltration step. It is believed that drying of diafiltered gelatine and/or subsequent milling and dry storage may re-introduce the off-flavour components removed by the filtration step.

Analysis has shown that the membrane permeate contains species of a molecular weight below 100 kD. Peak absorbtion of light of a wave-length of 214.4 nm was noted at 20 kD mass equivalent. It should be noted that the this 20 kD molecular weight is expressed in terms of the molecular weight of a globular marker protein of this mass. Gelatine and its oligo-peptidic digests are not globular proteins.

It is believed that the species present in the permeate comprise in part both oligopeptides derived from collagen by hydrolysis and other proteinaceous matter present in the original feedstock. In addition low-molecular weight organic species such as aldehydes, ketones and metabolites are believed to be removed. Analysis has indicated that other low-molecular weight components, particularly -2-propanon, toluene, hexanol, octanol and nonanol are removed by the process of the present invention.

In particular, it is believed that 4 and 5-methyl indane are removed by the filtration process. Accordingly, a further aspect of the present invention provides gelatine substantially free of 4 and 5-methyl indane.

4 and 5-methyl indane are not compounds which have previously been associated with the presence of off-flavours in gelatine. Consequently, it is believed that the it is not the methyl indanes per se which are responsible for the off taste, but rather compounds which presently remain in part unidentified but which are separated into the membrane permeate together with the methyl indanes in the process of the present invention. Thus, the methyl indanes can be seen as markers for the unspecified off-flavour promoting species removed in the process of the present invention.

Accordingly, a yet further aspect of the present invention provides a gelatine preparable by membrane filtration under such conditions as to substantially remove 4 and 5-methyl indane.

The origin of these indane compounds in the gelatine is obscure, as it is known (and mentioned above) that gelatine does not contain the indole-ring derived aminoacid tryptophane.

Typically, the process comprises the steps of;
a) dissolving dried gelatine in water,
b) subjecting the gelatine solution obtained in step (a) to membrane filtration to remove at least 10% wt of the gelatine solution,
c) optionally, repeating step (b) until a solution is obtained which is substantially free of 4 and 5-methyl indane.

By performing the process after drying of the gelatine, it is believed that off-flavour components generated during the drying process are removed. During the process of the present invention it is possible either to prepare a dilute solution of gelatine and concentrate this solution by a membrane filtration to the desired final concentration, or alternatively, it is possible to first concentrate the gelatine solution to a solution more concentrated than that desired before dilution to the required concentration.

As the gelatine is intended for use as a gelling agent it is important that the final gel strength is not adversely affected by the treatment process. It has been determined experimentally that the gel strength is not significantly reduced by the method of the present invention, as the reduction in gel strength following treatment according to the present invention is within the 10% variation in calculated and observed gel strength mentioned above.

Figure 1A:
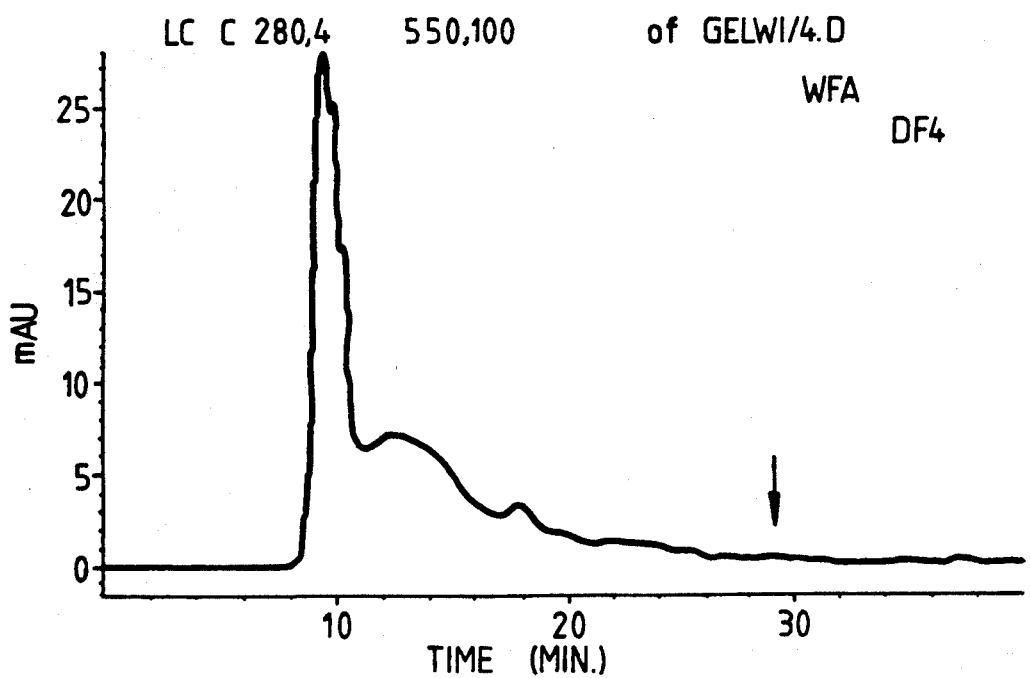

In order that the present invention may be further understood there follows hereafter, by way of example, a description of particular embodiments of the invention. The description refers to the accompanying figures wherein;

FIGS. 1A and 1B; show a graph of absorbtion of electromagnetic radiation of a wavelength of 280.4 nm for samples of gelatine eluted at varying times from a chromatographic column, both before and after membrane filtration according to the present invention.

FIG. 2; shows a graph of absorbtion of electromagnetic radiation of a wavelength of 214.4 nm for samples obtained by column chromatography of a permeate obtained by membrane filtration of gelatine solution according to the present invention.

EXAMPLE ONE

Purification of Gelatine

High quality gelatine obtained in the marketplace from "Extraco Nobel Industrier" and sold under the trademark "GELTEC UG-719-N" was membrane filtered, in batch, as follows;

2.5 kg of dry gelatine was dissolved, with stirring for ten minutes, in demineralized water at 60° C. in a thermostatted, heat-jacketed kettle and made-up to a concentration of 2.5 wt % in approximately 100 liters of solution. The solution was allowed to stand for 30 min at 55°–60° C. to deaerate.

The solution was continuously drawn from the kettle via a positive displacement pump (capacity 4 $m^3$/h, 40 bar) and fed to the membrane filtration apparatus at a throughput of 50 liters/min.

The membrane filtration apparatus-was a STORK-WAFILIN "Universal Pilot Plant" ultrafiltration installation, using 6.8 sqr. meter of a WFA 4010 membrane, available in the marketplace from STORK-WAFILIN N.V. The above-mentioned membrane was housed in four tubes arranged in two parallel flow-paths each containing two tubes connected in series, to give a flow path length of 76 meter. Each tube comprised nineteen filtration sections coupled in series and disposed in a serpentine configuration within a housing to collect permeate. Retentate was re-circulated to the kettle, with an approximate volume reduction of 1% per pass. The permeate flow rate was 25 liters/$meter^2$ hour. The average trans-membrane pressure was 300 kilo-pascal.

This process was continued until the volume of the process stream had reduced to 50 liters, with an approximate gelatine concentration slightly lower than 5% wt.

The retentate was diluted with 50 liters of de-mineralized water at 60° C. and the abovementioned process repeated. In all, the cycle of concentration and dilution was repeated four times to give a final gelatine concentration of slightly less than 5% wt.

The final solution was pale-yellow in hue and had a faint odour which was not unpleasant.

The above experiment was repeated with "Delftse" bloom 120 gelatine, available in the marketplace from "Delftse Lijm en Gelatine Frabriken", The Netherlands. This is a gelatine with a strong off-flavour and while of edible quality is not considered suitable for use in spreads. The starting solution in this second instance was distinctly ochre in hue and had a pronounced, unpleasant odour described as "dog-like". The final solution was pale yellow in hue and had a faint odour which was not unpleasant.

EXAMPLE 2

Preparation of a Spread

A 40% fat, edible water-in-oil spread was prepared as is known in the art at factory scale using products similar to the products of EXAMPLE 1 as the basis of the aqueous phase. The difference between the gelatine purification method of EXAMPLE 1 and that employed in the purification of the gelatine used in the present example were minor, in that a membrane type WFS8081 (cut-off 10 kD, available from Stork Wafilin) was used and the final concentration of the gelatine solution was 15%. This higher concentration was necessary to ship the concentrated, purified solution from the filtration plant (in Holland) to the factory (in Sweden). In order to ensure microbiological safety during shipping potassium sorbate was added to the gelatine solution.

The only difference between the spread-type products prepared was in respect of the type of gelatine used and the presence or absence of potassium sorbate included in the product.

The following products were prepared:

| | | | |
|---|---|---|---|
| 2A) | 3% EXTRACTO | gelatine | (unpurified) |
| 2B) | 3% EXTRACTO | gelatine + sorbate | (unpurified) |
| 2C) | 3% UF-DELFTSE | gelatine + sorbate | |
| 2D) | 3% DELFTSE | gelatine | (unpurified) |

It can be seen that the purified gelatine of the present invention was used only in example (2C).

The fresh products made with high quality and upgraded gelatine did not differ significantly.

Isolated waterphases were scored and described as follows by a trained panel of assessors and scored in a ranking test with 1=best and, higher scores indicating progressively worse products. The following results were obtained:

| | | |
|---|---|---|
| 2A) | score: 2.3 | gluey, sweet, fungid |
| 2B) | score: 3.8 | stuffy, sweet |
| 2C) | score: 4.0 | stuffy, sweet |
| 2D) | score: 4.3 | like burned rubber |

Although the product of example 2A was described as "gluey, sweet and fungid" only a faint impression of this taste was noted. It is clear from the results that sorbate, a common ingredient of edible spreads, has a deleterious effect on the taste but it can be seen that even without the presence of sorbate the score for example 2D was the worst obtained.

It can be seen that the products 2B and 2C are comparable, demonstrating the upgraded products of the present invention are at least as good as the products obtained by the methods of the prior art using the higher quality gelatine.

EXAMPLE 3

A further sample of a 40% spread was prepared using the first above-described method and the WFA 4010 membrane. The spread was presented to an experienced tasting panel for evaluation of off flavour, by comparison between low and high quality gelatine, both treated according to the present invention and untreated. Experiments were performed both on fresh samples and on samples which has been stored for six weeks.

No significant differences were noted between the freshly prepared spreads, whether or not the gelatine was treated according to the present invention.

Significant improvement in organoleptic properties were noted after six weeks when the treated and untreated low-quality gelatines were compared. On average the members of the panel reported an improvement in the organoleptic properties of the spread prepared with the upgraded low-quality gelatine as compared to the native low-quality gelatine. In particular the spread was described as less musty, less tart, less astringent in the throat, less bitter and more watery. No significant differences were noted between the treated and untreated high-quality gelatine.

From the above results it is clear that there is perceived variation in the quality of the low-quality gelatine. This variation is significant enough that the lower-quality gelatine can on occasion appear suitable for use in edible spreads, but the quality of products made with this material degrades within the shelf-life of the products.

In order to better characterise which off-flavour promoting species had been removed by the membrane filtration, samples of the low-quality gelatine from both before and after membrane filtration were analyzed by gel chromatography and gas chromatography in combination with mass spectrometry. It should be noted that although the reduction in off-flavour could be easily observed in a comparative organoleptic test, it was difficult to be entirely precise about the chemical species contributing to the off-flavour.

EXAMPLE 4

Gel Chromatography of Retentate

A sample of the high quality untreated commercial gelatine and a sample of the same gelatine membrane-filtered according to the present invention were each taken at 5% solution in water. Both samples were heated for 20 min at 50° C. in a thermostatted water bath to melt the gelatine and promote effective mixing during subsequent dilution.

The heat-treated solutions were diluted with elution buffer pre-heated to 50° C. (0.05 Molar sodium phosphate/0.15 Molar sodium chloride, pH 7.2) to a final concentration of 0.9% wt. The diluted solutions were cooled to room temperature and filtered through 0.22 m low protein-binding filter ex. "MILLIPORE" (Registered Trade Mark). The samples were separately run on gel filtration columns packed with "SUPEROSE 12" (Registered Trade Mark) ex. "PHARMACIA". Two-hundred and fifty microliters of the samples prepared as above being loaded onto each column.

Detection of the sample components was performed by an optical spectrophotometer of the "Diode Array Detection System" type HP 1040 at a wavelength of 280.4 nm, a characteristic absorbtion wavelength for proteinaceous matter. The gelatine recovery of the column measured spectrophotometrically was 92% of feed. The elution buffer throughput was 0.7 ml/min.

FIG. 1 shows chromatograms of both (A) membrane filtered and (B) untreated gelatine. The results show that there has been some change in the content of species (indicated in the figure by arrows) which exhibit a

EXAMPLE 5

Gel Chromatography of Permeate

EXAMPLE 4 was repeated with a sample of permeate, produced according to the method of EXAMPLE 1, from the low-quality gelatine. FIG. 2, shows the optically resolved gel-filtration chromatogram viewed at a wavelength of 214.4 nm. Myoglobin of molecular weight 17 kD was used as a marker. It can be seen that the permeate is rich is species eluted at a time consistent with a molecular weight of around 20 kD (relative to the marker in this chromatographic method). It is again noted that the molecular weight of intact collagen is in the region of 340 kD (absolute), and the collagen subunits each have a molecular weight of around 100 kD (absolute).

EXAMPLE 6

Gas Chromatography of Retentate

A chromatography column was packed with the commercially available resin "XAD-2", known to adsorb apolar materials. 5% wt solutions of both membrane filtered and un-purified low-quality gelatine were eluted over the column. Following drainage of the solutions species retained on the column were eluted with ether and subsequently separated by gas chromatography with detection in a mass spectrometer.

The presence of 4 and 5-methyl indane was observed in the eluate of the untreated low-quality sample as compared with the absence of detectable quantities of these compounds in the eluate of the treated sample. The untreated samples did not comprise any clearly detectable free amino acids.

From the abovementioned taste studies it is concluded that the organoleptic properties of low-quality gelatine in spreads can be significantly improved by treatment according to the present invention. Although attempts to characterise the particular components responsible for the off-flavour development have been unsuccessful, it is believed that the off-flavours are removed under conditions which remove the 4 and 5-methyl indanes, and for this reason the 4 and 5-methyl indanes provide a useful analytical marker for the process of the present invention.

We claim:

1. A process for preparing an edible emulsion spread including an aqueous phase comprising:
   a) dissolving dry gelatine in water, wherein the gelatine comprises impurities selected from the group consisting of aldehydes, ketones, 2-propanon, toluene, hexanol, octanol, nonanol, 4 and 5-methyl indane and mixtures thereof;
   b) removing the impurities by subjecting the gelatine solution obtained in step (a) to membrane filtration until the volume of the gelatine solution is reduced by at least 10% wt, wherein a membrane permeate and a wet retentate are obtained;
   c) recovering the wet retentate obtained in step (b); and
   d) adding a fat phase to the wet retentate to obtain the edible spread.

2. The process of claim 1 wherein the membrane permeate comprises species having a molecular weight below 100 kD.

3. The process of claim 2 wherein the species have an average diffusion rate as measured by gel chromatography equivalent to that of a globular protein of a molecular weight below 20 kD.

4. The process of claim 2 wherein the membrane permeate comprises oligopepitides derived from collagen by hydrolysis.

5. The process of claim 1 wherein the gelatine prior to purification contains 4 and 5-methyl indane, the process further comprising repeating step (b) until the wet retentate is obtained which is substantially free of 4 and 5-methyl indane.

6. The process of claim 1 wherein membrane filtration is a membrane diafiltration performed at a membrane with a molecular cut-off of 10 kD.

7. The process of claim 1 wherein the membrane filtration is a membrane diafiltration performed at a membrane with a molecular cut-off of 10 kD.

* * * * *